(12) United States Patent
Stevens et al.

(10) Patent No.: US 11,754,025 B2
(45) Date of Patent: Sep. 12, 2023

(54) AIR-INDUCTION SYSTEM WITH HYDROCARBON EMISSIONS VALVE

(71) Applicant: FORD GLOBAL TECHNOLOGIES, LLC, Dearborn, MI (US)

(72) Inventors: James Stevens, Belleville, MI (US); Brendan F. Diamond, Grosse Pointe, MI (US); David Guglielmo, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 225 days.

(21) Appl. No.: 17/115,212

(22) Filed: Dec. 8, 2020

(65) Prior Publication Data

US 2022/0178334 A1 Jun. 9, 2022

(51) Int. Cl.
*F02M 35/10* (2006.01)
*F02M 35/04* (2006.01)
*B01D 46/52* (2006.01)

(52) U.S. Cl.
CPC ...... *F02M 35/10144* (2013.01); *F02M 35/04* (2013.01); *B01D 46/521* (2013.01); *B01D 2253/108* (2013.01); *B01D 2253/25* (2013.01); *B01D 2257/702* (2013.01)

(58) Field of Classification Search
CPC .. F02M 35/10; F02M 35/10144; F02M 35/04; B01D 46/521
See application file for complete search history.

(56) References Cited

U.S. PATENT DOCUMENTS

| 8,025,042 | B2* | 9/2011 | Kamiya | F02M 35/10085 |
| | | | | 123/308 |
| 8,166,957 | B2 | 5/2012 | Lupescu et al. | |
| 8,191,539 | B2 | 6/2012 | Bellis | |
| 9,163,571 | B2 | 10/2015 | Dudar et al. | |
| 2003/0136386 | A1* | 7/2003 | Itakura | F02M 25/06 |
| | | | | 123/520 |
| 2005/0150475 | A1* | 7/2005 | Phaneuf | F02M 35/10275 |
| | | | | 123/518 |
| 2006/0048738 | A1* | 3/2006 | Isaji | F02B 31/06 |
| | | | | 123/184.56 |
| 2006/0048739 | A1* | 3/2006 | Isaji | F02B 31/06 |
| | | | | 123/184.56 |
| 2006/0150956 | A1* | 7/2006 | Burke | F02M 35/10144 |
| | | | | 123/518 |
| 2007/0227495 | A1* | 10/2007 | Isaji | F02B 31/06 |
| | | | | 123/306 |

(Continued)

FOREIGN PATENT DOCUMENTS

JP 2007205302 A 8/2007

*Primary Examiner* — Long T Tran
(74) *Attorney, Agent, or Firm* — Vincent Mastrogiacomo; Brooks Kushman P.C.

(57) ABSTRACT

An engine includes an intake manifold and an air-induction system configured to deliver air to the intake manifold. The air-induction system includes a throttle attached to the intake manifold, an air cleaner, conduit connecting between the air cleaner and the throttle to create a flow path therebetween, and a valve disposed in the flow path to be upstream of the throttle and downstream the air cleaner. The valve has a closed position in which the flow path is blocked to hold hydrocarbons within the intake manifold and inhibit emission therefrom and has an open position in which the flow path is unimpeded.

12 Claims, 2 Drawing Sheets

(56) References Cited

U.S. PATENT DOCUMENTS

| | | | |
|---|---|---|---|
| 2009/0107472 A1* | 4/2009 | Makino | F02M 25/0872 123/520 |
| 2009/0282793 A1* | 11/2009 | Tomlin | F02M 25/0854 55/385.3 |
| 2010/0065030 A1* | 3/2010 | Bellis | F02M 35/024 123/574 |
| 2013/0228145 A1 | 9/2013 | Moyer et al. | |
| 2015/0211393 A1* | 7/2015 | Ishihara | F02B 31/06 123/188.2 |

* cited by examiner

AIR-INDUCTION SYSTEM WITH HYDROCARBON EMISSIONS VALVE

TECHNICAL FIELD

This disclosure relates to air-induction systems for internal-combustion engines and more specifically to reducing the emission of hydrocarbons from air-induction systems.

BACKGROUND

Motorized vehicles include an internal combustion engine that operates on fuel such as gasoline, diesel or the like. The engine includes an intake manifold that receives air through an air-induction system. When the engine is OFF, fuel residue in the intake manifold can evaporate into hydrocarbon emissions that can emanate from the intake manifold of the engine, through the air-induction system, and escape to the atmosphere. Many governments have regulations limiting evaporative hydrocarbon emissions.

SUMMARY

According to one embodiment, an engine includes an intake manifold and an air-induction system configured to deliver air to the intake manifold. The air-induction system includes a throttle attached to the intake manifold, an air cleaner, conduit connecting between the air cleaner and the throttle to create a flow path therebetween, and a valve disposed in the flow path to be upstream of the throttle and downstream the air cleaner. The valve has a closed position in which the flow path is blocked to hold hydrocarbons within the intake manifold and inhibit emission therefrom and has an open position in which the flow path is unimpeded.

According to another embodiment, an engine includes an intake manifold and an air-induction system configured to deliver air to the intake manifold. The air-induction system includes a throttle attached to the intake manifold, an air cleaner, and a valve. The valve has a body defining an inlet fluidly connected to the air cleaner, an outlet fluidly connected to the throttle, and a valve seat disposed between the inlet and the outlet. The valve further has an actuatable restriction member that is spaced from the valve seat when the valve is in an open position and that is seated on the valve seat when the valve is in a closed position such that hydrocarbons emanating from the intake manifold are inhibited from passing therethrough to reduce hydrocarbon emissions.

According to yet another embodiment, an air-induction system of an engine includes a throttle attachable to an engine intake manifold, an air cleaner, and a valve. The valve has a body defining an inlet fluidly connected to the air cleaner, an outlet fluidly connected to the throttle, and a valve seat disposed between the inlet and the outlet. The valve further has an actuatable restriction member that is seated on the valve seat when the valve is in a closed position to inhibit hydrocarbons from passing therethrough and that is spaced from the valve seat when the valve is in an open position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
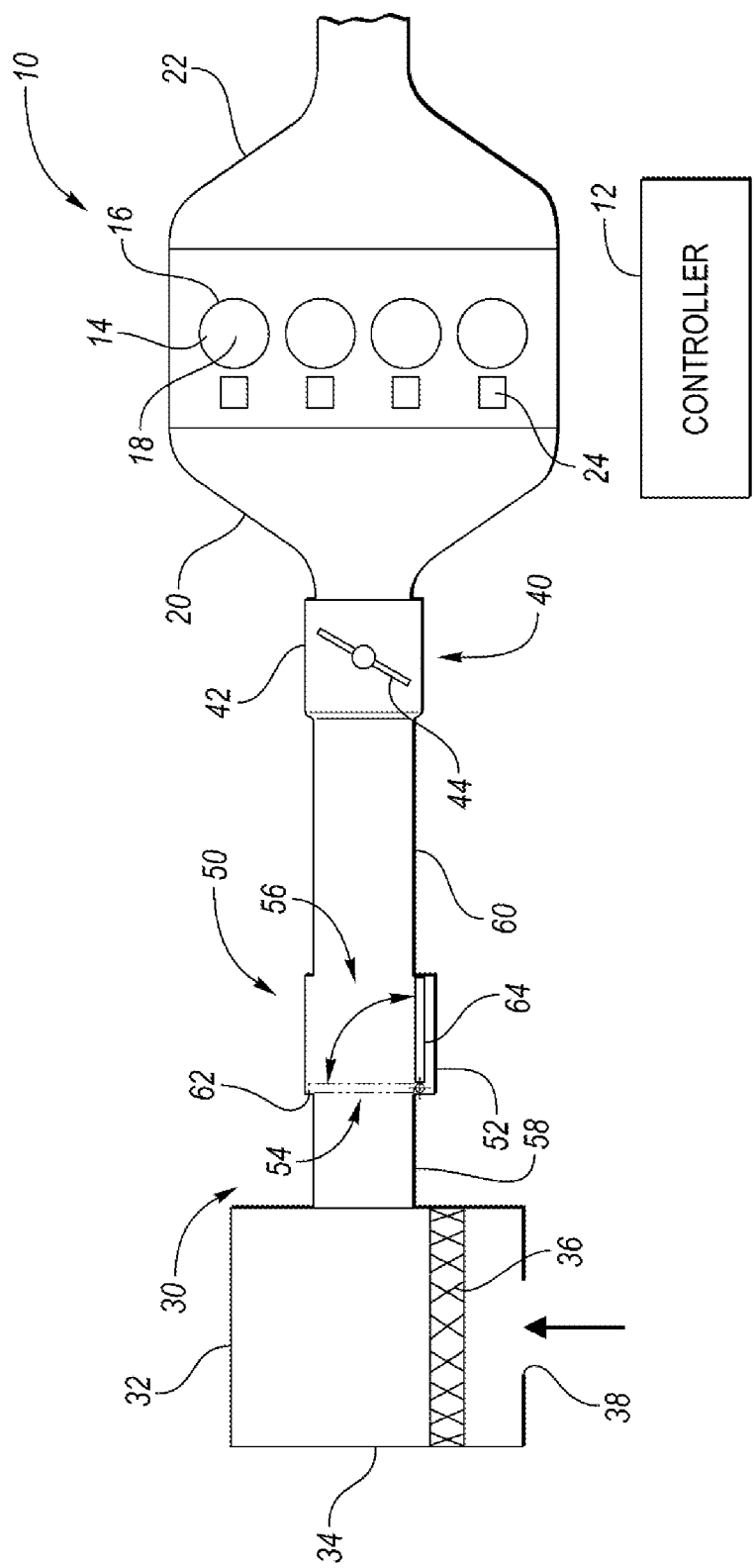
FIG. 1 is a schematic diagram of an engine and an air-induction system.

Referring to FIG. 1, an internal combustion engine 10 is controlled by electronic engine controller 12. Engine 10 includes combustion chambers 14 and cylinder walls 16 with pistons 18 positioned therein and connected to a crankshaft (not shown). The engine 10 also includes an intake manifold 20 that supplies air to the combustion chambers 14 and an exhaust manifold 22 that removes exhaust from the engine 10. The engine 10 includes intake valves and exhaust valves that selectively connect the combustion chambers 14 in fluid communication with the intake manifold and the exhaust manifold. The intake and exhaust valves are operated by one or more camshafts.

Fuel injectors 24 are shown positioned to inject fuel directly into cylinders 14, which is known to those skilled in the art as direct injection. Additionally or alternatively, fuel may be injected to an intake port of the intake manifold 20, which is known to those skilled in the art as port injection. The fuel injectors 24 delivers liquid fuel in proportion to a pulse width of a signal from the controller 12. Fuel is delivered to fuel injectors 24 by a fuel system (not shown) including a fuel tank, a fuel pump, and a fuel rail. The fuel injectors 24 are supplied operating current from a driver that responds to controller 12.

The engine 10 may include a distributorless ignition system that provides an ignition spark to combustion chambers 14 via spark plugs in response to controller 12. However, in other examples the ignition system may not be included in the engine 10 and compression ignition may be utilized.

The engine 10 includes an air-induction system 30 configured to supply air to the intake manifold 20. The air-induction system 30 includes an air cleaner 32 having an air box 34 and an air filter 36. The air box 34 includes an opening 38 that allows outside air to enter into the system 30. The filter 36 extends over the opening 38 to filter out particulate matter. The air cleaner 32 is typically mounted remote from the engine 10 and is connected by one or more conduit. The air-induction system 30 may include a throttle 40 that may be mounted to the intake manifold 20. The throttle 40 may include a throttle body 42 and a throttle plate 44 such as a butterfly valve. The throttle plate 44 is used to control the amount of air entering the engine 10 and is typically controlled according to an accelerator pedal either electronically or by a cable.

During operation, each cylinder 14 within the engine 10 typically undergoes a four stroke cycle: the cycle includes the intake stroke, compression stroke, expansion stroke, and exhaust stroke. During the intake stroke, generally, the exhaust valve closes and the intake valve opens. Air is introduced into combustion chamber 14 via the intake manifold 20, and piston 18 moves to the bottom of the cylinder to increase the volume within combustion chamber 14. The position at which piston 18 is near the bottom of the cylinder and at the end of its stroke (e.g. when combustion chamber 14 is at its largest volume) is typically referred to by those of skill in the art as bottom dead center (BDC). During the compression stroke, the intake and exhaust valves are closed. The piston 18 moves toward the cylinder head to compress the air within combustion chamber 14. The point at which piston 18 is at the end of its stroke and closest to the cylinder head (e.g. when combustion chamber 14 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as a spark plug, resulting in combustion. Additionally or alternatively compression may be used to ignite the air/fuel mixture. During the expansion stroke, the expanding gases push piston 18 back to BDC. The crankshaft converts piston movement into a rotational torque of the rotary shaft. Finally, during the exhaust stroke, the exhaust valve opens to release the combusted air-fuel mixture to exhaust manifold 22 and the piston 18 returns to TDC. Note that the above is described merely as an example, and that intake and exhaust valve opening and/or closing timings may vary, such as to provide positive or negative valve overlap, late intake valve closing, or various other examples.

The controller 12 may be a microcomputer including: a microprocessor unit, input/output ports, read-only memory, random-access memory, keep-alive memory, and a data bus. The controller 12 may receiving various signals from sensors coupled to engine 10, in addition to those signals previously discussed, including: engine coolant temperature (ECT) from temperature sensor coupled to cooling sleeve; a position sensor coupled to an accelerator pedal for sensing accelerator position adjusted by foot; a knock sensor for determining ignition of end gases (not shown); a measurement of engine manifold pressure (MAP) from pressure sensor coupled to intake manifold 20; an engine position sensor from a Hall effect sensor sensing crankshaft position; a measurement of air mass entering the engine from a mass airflow sensor (e.g., a hot wire air flow meter); and a measurement of throttle position from a sensor. Barometric pressure may also be sensed for processing by controller 12.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation of the engine, fuel sprayed into the intake manifold 20, by a fuel injector 24, may remain on the walls of intake manifold 20 after the engine 10 is shut down and not performing combustion. Consequently, fuel vapor may flow out of the intake system 30 during engine shut down. These hydrocarbon emissions can travel through the air-induction system 30 and exit through the opening 38. As a result, evaporative emissions of the vehicle may be increased and, in some cases, exceed government regulations.

To mitigate this problem, the air-induction system 30 includes a valve 50 configured to trap hydrocarbons within the air-induction system 30 and prevent the release to the atmosphere. The valve 50 is designed to be closed when the engine is OFF to reduce evaporative emissions and is open when the engine is ON to allow the induction of air into the engine 10. The valve 50 may be a flap valve, a swinging-door valve, a ball valve, a butterfly valve, a reed valve, or the like. The valve 50 is placed downstream of the air cleaner 32 and upstream of the throttle 40. The valve 50 may be placed on the conduit between the air cleaner 32 and the throttle 40 to be disposed in the flow path between the air cleaner 32 and the throttle 40. The valve 50 may include a valve body 52 defining an inlet 54 and an outlet 56. The inlet 54 it is connected to the air cleaner 32 by one or more conduit or ducts 58, and the outlet 56 is connected to the throttle body 42 by one or more conduit or ducts 60. The valve body 52 may also define a valve seat 62. The valve 50 includes a restriction member 64 that is actuatable to open and close the valve 50. The restriction member 64 may be a plate, a flap, a butterfly, a swinging door, a ball, a reed, or the like. In the illustrated embodiment, the restriction member 64 is a flap that is pivotally connected to the valve body 52. The flap 64 may be pivotable between the open position (shown in solid), the closed position (shown in phantom), and a plurality of intermediate positions. When in the open position, the flap 64 is pivoted to be generally out of the flow path so that airflow is unimpeded. When in the closed position, the flap 64 is seated against the valve seat 62 to block the flow path and trap hydrocarbons.

The valve 50 may be an electrically actuated by the controller 12 or mechanically actuated. In the electric embodiment, the restriction member 64 is operably coupled to an electric actuator, such as a stepper motor, a screw motor, or the like, configured to pivot the restriction member 64 between the open and closed positions. The mechanical version may operate based on vacuum pressure and spring bias. For example, the valve may be biased to the closed position by a resilient member, and when the engine is started, the vacuum pressure within the intake manifold 20 is sufficient to overcome the bias and open the restriction member 64.

The restriction member 64 may be a solid piece of metal, plastic, or other material, or may include a filter medium that allows air to pass therethrough. The filter medium is permeable to air but is impermeable to hydrocarbons. The filter medium is sometimes referred to as a hydrocarbon trap. Including the filter medium, as opposed to a solid piece, allows the engine to run even when the valve is closed since the filter allows the passing of air. This is advantageous, in that, if the valve becomes stuck closed, the vehicle is still drivable.

Figure 2:
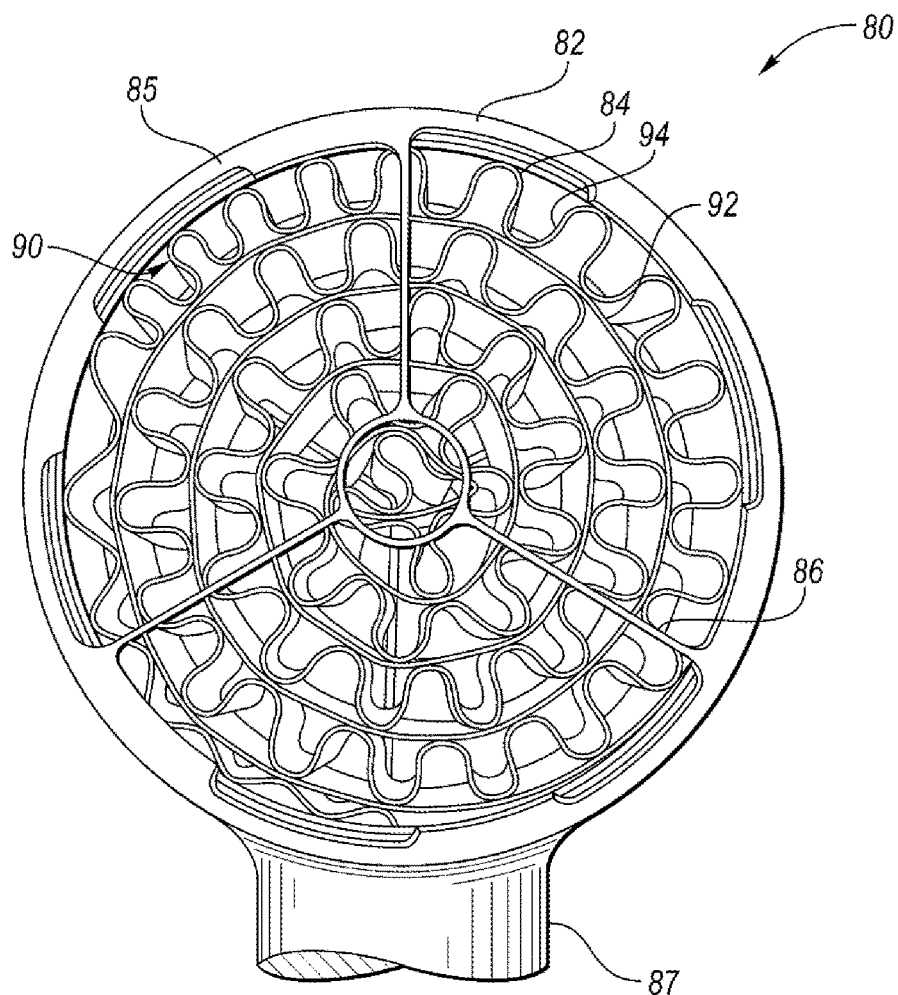
FIG. 2 is a front view of a restriction member of the valve having a hydrocarbon trap.

FIG. 2 illustrates an example restriction member 80 that may be used in the valve 50. The restriction member 80 may include a frame 82 that supports a hydrocarbon trap 84. The frame 82, at least in the illustrated embodiment, has an outer circular portion 85 that forms the perimeter of the restriction member 80 and provides a solid surface for sealing against the valve seat. A tab portion 87 of the outer frame 85 may be pivotally attached to the valve body and connected to the actuator. The frame 82 also includes interior segments 86. Attached to the frame 82 is the hydrocarbon trap 84. The hydrocarbon trap is 84 permeable to air but is generally impermeable to hydrocarbons Thus, when the valve is in the closed position, air may pass therethrough but hydrocarbons generally cannot.

The hydrocarbon trap 84 may be a passive-adsorption flow-through hydrocarbon trap that adsorbs hydrocarbons as they pass therethrough. The hydrocarbon trap 84 is configured to collect and adhere hydrocarbon gases, such as the "light ends" of gasoline on the surface of the adsorbing material in the trap 84. These "light ends" have been found to be one of the primary constituents of the vapors emanating from an air induction system during engine off soaks. Although described as an adsorbing trap, in some embodiments, different adsorbing materials, or gases are collected by full assimilation or incorporation, may be incorporated as part of the hydrocarbon trap.

The hydrocarbon trap 84 may include an adsorber roll 90 having a multi-layered winding structure. The adsorber roll 90 may include a layered roll of adsorbing material 92 and corrugate support 94. The adsorbing material 92 and corrugate support 94 may be wound in a continuous spiral and positioned inside the outer frame 85. The wound adsorber roll 90 may take the form of a volute or spiral shape with alternating layers of corrugate support and adsorber material. The corrugate support 94 may provide the structural support for the adsorbing material 92 and provide spacing to enable air to flow through the hydrocarbon trap 84.

The corrugate support and adsorbing material may form adsorbing channels, running parallel along an air flow axis, perpendicular to the radial and/or the azimuthal axes. Such adsorbing channels may be longitudinal passages which enable air to flow through the hydrocarbon trap 84. As engine off soak occurs, hydrocarbons, for example fuel vaporized from the engine, may flow though the intake and into the trap 84. The adsorbing material 92 may adsorb hydrocarbons and may further store hydrocarbons until release of the hydrocarbons, to regenerate the adsorber. For example, the hydrocarbons may be released from the adsorbing material through air flow over the adsorbing material and/or through heating. For example, air flow through the trap 84 may release the hydrocarbons from the adsorbing material. Hydrocarbons released from the hydrocarbon trap may then be taken in by the engine for use in combustion during engine operation, such as engine start up. In alternate examples, the adsorbing material may store hydrocarbons until the adsorbing material is replaced or regenerated in another way.

Although disclosed where the corrugate support and adsorbing material are wound to form a roll, it should be appreciated that in some examples the corrugate support and adsorbing material may be layered or extended such that the long axes is in the same plane of the trap.

The adsorbing material 92 may be composed of a hydrocarbon adsorbing material, for example, the adsorbing material may be "carbon paper," carbon coated foam or Zeolite coated/impregnated paper. The adsorbing material adsorbs hydrocarbons for storage during engine off soak period and releases the hydrocarbons for consumption by the engine during engine running periods. In some examples, the adsorbing material may be composed of a foam and/or paper treated with a wash, a coating or resin. Example treatments and materials include carbon coating on a foam, zeolite coating on a metallic substrate, a ceramic substrate, or other similar hydrocarbon adsorbing material. The adsorbing material 92 may be treated on a single side or on both sides. Further the adsorbing material may be a single ply material or may be layered. For example, the adsorbing material maybe a multiple ply sheet. Thus, in some examples, the adsorbing material may be single or double sided, and include any hydrocarbon adsorbing material depending on the use and application for the hydrocarbon trap.

In some examples, the adsorbing material 92 may be substantially smooth, while in other examples, the adsorbing material may be perforated or fibrous. In still further examples, the adsorbing material 92 may include raised bumps or other structures to increase adsorbing surface area and/or to decrease any drag effects on intake air.

As described above, the adsorbing material 92 may be rolled with a corrugate support 94. The corrugate support 94 may include an undulating shape, such as being a sinusoidal-shaped layer such that the material is wave-like. As such, the corrugate support may include a plurality of wave structures. The wave structures may be uniform throughout a portion of the corrugate support. In other examples, the wave structures may vary throughout the corrugate support or vary in a section of the corrugate support.

The corrugate support 94 may be a single-piece plastic material to provide the support for the adsorbing material. The corrugate support 94 may further act as a spacer, defining a separation or space between spiraled layers of adsorbing material 92, and defining adsorbing channels through the hydrocarbon trap 84 to enable the flow of air. Although described here as a plastic material, the corrugate support may be another support material, such as, but not limited to aluminum, hardened resin, metallic materials or the like.

The sinusoidal shape of the corrugate support 94 may separate and support the adsorbing material 92 in a configuration which enables increased hydrocarbon adsorption. The sinusoidal shape may define a series of waves, with crests, troughs, and wavelengths. In some examples, the waves may be uniform throughout the corrugate support. In other systems, the waves may attenuate along the length of the corrugate support or otherwise vary in regards to the crest or trough, height or depth, or the wavelength. The wavelength may be the distance between successive crests or successive troughs. The crests, troughs, and wavelength may be the same throughout the sheet or variable depending on the application of the adsorber. In some examples, the wavelength may be used to define the surface area of adsorbing material 92 exposed in adsorbing channels available to adsorb hydrocarbons.

In some examples, the radial distance from the bottom of a trough to the top of a successive crest may define a corrugate support height. In alternate examples, the vertical distance from the bottom of a trough to the top of a successive crest may define the corrugate support height. In further examples, the corrugate support height may be twice the distance from the center of a wave to a crest. In still further examples, the corrugate support height may be twice the distance from the center of a wave to the trough. Corrugate support height and wavelength may together define the dimensions of adsorbing channels. In this way, airflow restriction may be designed according to different applications, for example increasing air mass to be taken in per cycle of an engine.

Although discussed with a single adsorbing material layer and a single corrugate support layer, it should be appreciated that additional layers of adsorbing material or corrugate support may be included in the adsorber roll 90. Thus, although shown where the adsorber roll includes an alternating layer of corrugate support and a layer of adsorbing material, in other examples, additional layers of corrugate support and adsorbing material may be included. Thus, in some examples, the corrugate support may support two or more adsorbing layers. The adsorbing layers may have different adsorbing properties. The number of layers of adsorbing material may be defined by the length of the adsorbing material sheet and may further enable increased adsorbing surface area.

Control logic or functions performed by controller 12 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 12. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 3:
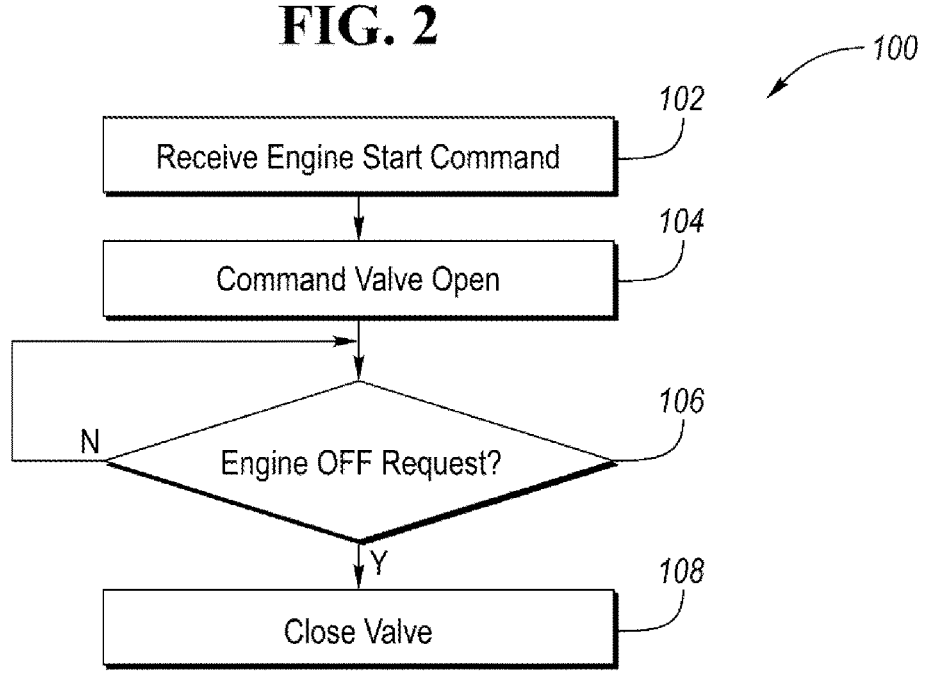
FIG. 3 is a flowchart of an algorithm for operating an evaporative-emissions valve of an air-induction system.

FIG. 3 illustrates a flow chart 100 for controlling an electrically actuated valve configured to prevent the release of evaporative emissions. As explained above, the controller commands the valve open when the engine is running to reduce air flow resistance through the air-induction system and commands the valve closed when the engine is OFF to reduce evaporative emissions. Control begins at operation 102 where the controller receives an engine start command. In response, the controller commands the valve to the open position at operation 104. Depending upon the design of the valve, this may include sending a signal to an electric actuator associated with the valve and commanding it to rotate the restriction member, for example. Example signals and conditions used to cause the valve to open may include engine speed non-zero, engine load non-zero, non-zero air flow in intake system, ignition button being pressed, transmission in gear. In one or more alternative embodiments, the valve may not immediately open. Instead, the valve opening logic may keeping valve closed at idle and/or low-load engine operating conditions to ensure the hydrocarbon trap is purged appropriately. Upon surpassing an engine load or speed threshold, the valve is be open to reduce air-flow restriction. Additionally, or alternatively, a timer approach may be used after engine start to open the valve, e.g. keep valve closed for 10 seconds after engine start.

The valve remains in the open position for the duration of the engine ON cycle. At operation 106, the controller determines if an engine-off request has been received. Alternatively, the controller may monitor for engine speed, airflow being zero, ignition signal, engine load, etc. If no, the valve remains in the open position. If yes, the valve is commanded to the closed position at operation 108. The valve will remain in the closed position while the engine is OFF to reduce evaporative emissions and will again be reopened at the next engine start event or shortly thereafter.

The above-described valve may be added to the air-induction system of any engine struggling to meet government-imposed or self-imposed limits on evaporative emissions. By placing the hydrocarbon trap on the movable restriction member of the valve, it can be moved out of the air-flow path when the engine is ON to preserve vehicle performance.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An engine comprising:
an intake manifold; and
an air-induction system configured to deliver air to the intake manifold, the air-induction system including:
a throttle attached to the intake manifold,
an air cleaner,
conduit connecting between the air cleaner and the throttle to create a flow path therebetween,
a valve disposed in the flow path to be upstream of the throttle and downstream the air cleaner, the valve having a restriction member that is movable between a closed position in which the flow path is blocked to hold hydrocarbons within the intake manifold and inhibit emission therefrom and an open position in which the flow path is unimpeded, wherein the restriction member includes a hydrocarbon-adsorbing sheet having at least one of a paper including a hydrocarbon adsorbing coating, a carbon coated foam, and zeolite; and
a controller programmed to (i) command the valve to the open position in response to the engine being ON and (ii) command the valve to the closed position in response to the engine being OFF.

2. The engine of claim 1, wherein the restriction member includes a frame that supports the hydrocarbon-absorbing sheet, wherein the hydrocarbon-absorbing sheet forms a hydrocarbon barrier that inhibits flow of hydrocarbon emissions from the intake manifold when in the closed position and is permeable to air so that air can flow through the flow path regardless of a position of the valve.

3. The engine of claim 2, wherein the restriction member is a flap that is pivotally attached to a body of the valve.

4. An engine comprising:
an intake manifold;
an air-induction system configured to deliver air to the intake manifold, the air-induction system including:
a throttle attached to the intake manifold,
an air cleaner, and
a valve having a body defining an inlet fluidly connected to the air cleaner, an outlet fluidly connected to the throttle, and a valve seat disposed between the inlet and the outlet, the valve further having an actuatable restriction member that is spaced from the valve seat when the valve is in an open position and that is seated on the valve seat when the valve is in a closed position such that hydrocarbons emanating from the intake manifold are inhibited from passing therethrough to reduce hydrocarbon emissions, wherein the restriction member includes a frame and a hydrocarbon trap supported by the frame, wherein the hydrocarbon trap is configured to adsorb hydrocarbons passing therethrough; and
a controller programmed to (i) command the valve to the open position in response to the engine being ON and (ii) command the valve to the closed position in response to the engine being OFF.

5. The engine of claim 4, wherein the restriction member is a flap that is pivotally connected to the body.

6. The engine of claim 4, wherein the hydrocarbon trap includes an adsorbing material sheet including at least one of a paper having a hydrocarbon adsorbing coating, a carbon coated foam, and zeolite.

7. The engine of claim 4, wherein the valve further has a resilient member urging the restriction member to be seated on the valve seat to bias the valve to the closed position.

8. The engine of claim 4, wherein the air-induction system further includes a first duct connecting the inlet to the air cleaner and a second duct connecting the outlet to the throttle.

9. An air-induction system of an engine comprising:
a throttle attachable to an engine intake manifold;
an air cleaner; and
a valve having a body defining an inlet fluidly connected to the air cleaner, an outlet fluidly connected to the throttle, and a valve seat disposed between the inlet and the outlet, the valve further having an actuatable restriction member that is seated on the valve seat when the valve is in a closed position to inhibit hydrocarbons from passing therethrough and that is spaced from the valve seat when the valve is in an open position, wherein the restriction member includes a frame and a hydrocarbon trap supported by the frame, wherein the hydrocarbon trap is configured to adsorb hydrocarbons passing therethrough and permits airflow therethrough, wherein the hydrocarbon trap includes an adsorbing material sheet including at least one of a paper having a hydrocarbon adsorbing coating, a carbon coated foam, and zeolite.

10. The air-induction system of claim 9, wherein the restriction member is a flap that is pivotally connected to the body.

11. The air-induction system of claim 5, wherein the valve is electrically controlled by a controller that is programmed to (i) command the valve to the open position in response to the engine being ON and (ii) command the valve to the closed position in response to the engine being OFF.

12. The air-induction system of claim 9, wherein the throttle includes a throttle body and a throttle plate.

* * * * *